Nov. 3, 1953        E. C. MYERS        2,657,538
TORIC FLUID DISPLACEMENT CHAMBER AND PACKING THEREFOR
Filed Dec. 5, 1945        3 Sheets-Sheet 1

INVENTOR.
Edward C. Myers
BY Emerson B. Donnell
ATTORNEY.

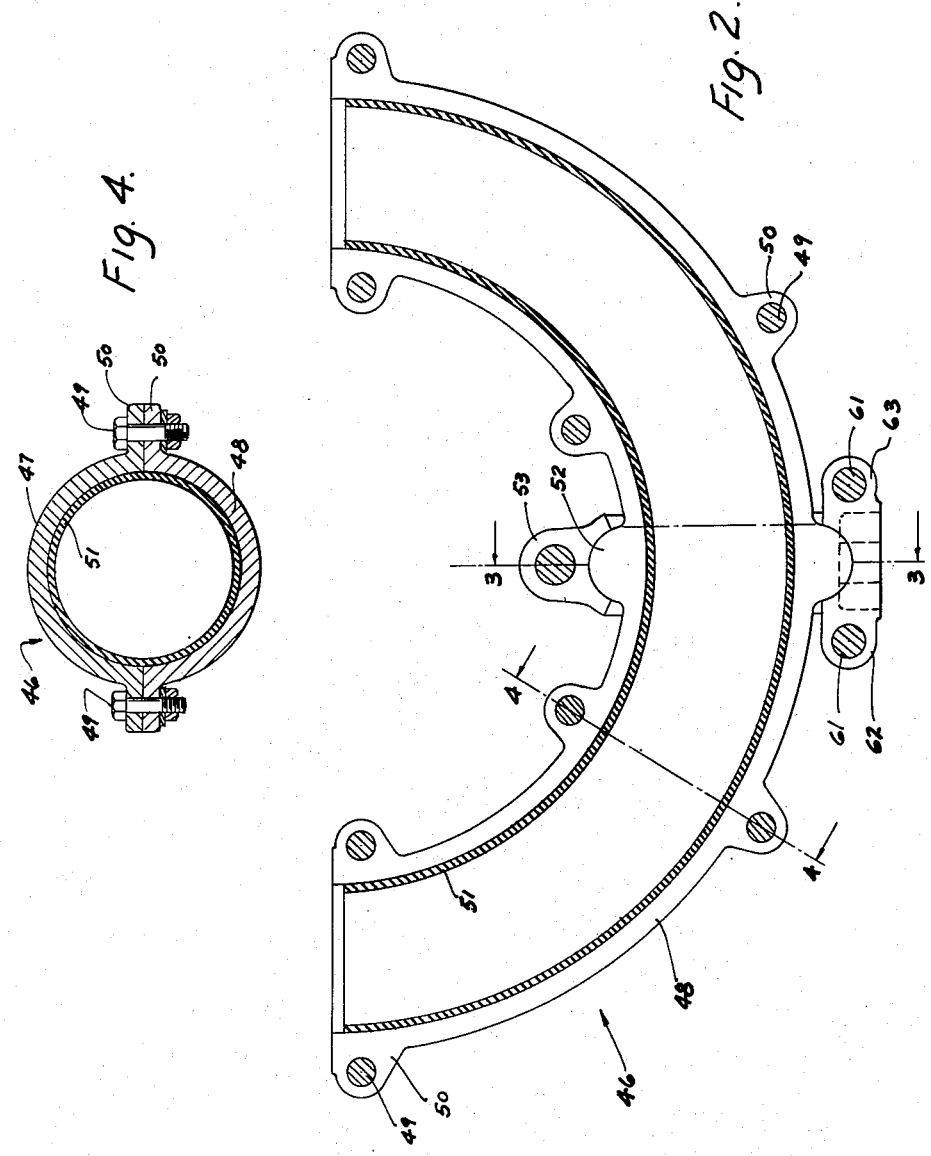

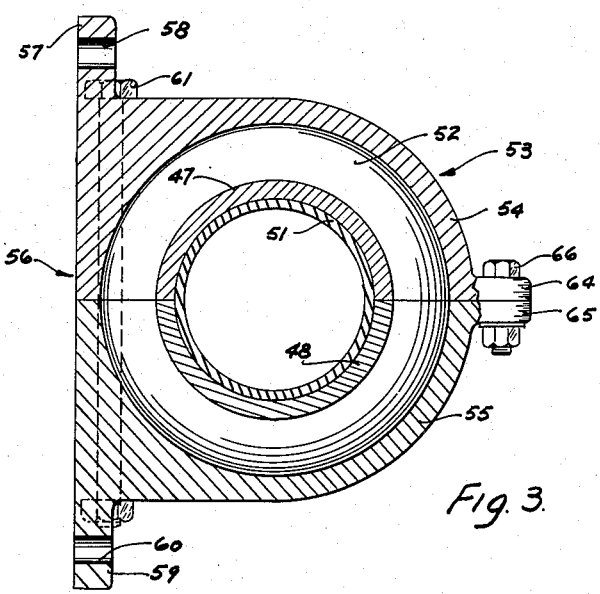

Patented Nov. 3, 1953

2,657,538

UNITED STATES PATENT OFFICE 2,657,538

TORIC FLUID DISPLACEMENT CHAMBER AND PACKING THEREFOR

Edward C. Myers, Wilmette, Ill.

Application December 5, 1945, Serial No. 632,941

3 Claims. (Cl. 60—54.6)

The present invention relates to fluid motors, and particularly those of the type comprising a displacement chamber in which is a movable piston, and an object of the invention is to generally improve the construction and operation of devices of this class.

In certain classes of hydraulic controls it is desirable to produce a part revolution in a driven element, for example in the pilot truck of a tractor, the rudder of a boat, airplane, or the like, and in the past this has been done with a power cylinder connected to the element to be turned by means of gearing, levers, etc., which develop lost motion and other defects after a period of use. It has been desirable in order to simplify such devices and avoid the above defects, to provide a curved "cylinder" which could propel a piston in a path such that it could be solidly connected to the stem or post to be controlled, without the interposition of gearing, jointed links or other parts subject to wear or failure. However, the construction of such a cylinder and piston and transmitting the motion from the piston to the element to be controlled presented difficulties which appeared, as a practical matter to be insurmountable.

Accordingly a further object is to provide a construction of curved displacement chamber which can be readily manufactured, which can be readily assembled and installed, and which will actuate a piston having a direct connection with the element to be controlled.

A further object is to provide a piston and connection for use with such a cylinder.

A further object is to provide an improved cylinder and piston therefor which will prevent substantially all fluid leakage past the piston.

Further objects and advantages will become apparent from the following specification and accompanying drawings in which satisfactory embodiments of the invention are shown, but it is to be understood that the invention is not to be taken as limited to the precise embodiments disclosed, or in fact in any manner except as herein set forth.

In the drawings, Figure 1 is a horizontal sectional view of one embodiment of the invention.

Fig. 2 is a similar view on a larger scale of a portion of a similar device showing a modified construction.

Fig. 3 is a sectional view taken substantially on the line 3—3 of Fig. 2.

Fig. 4 is a sectional view taken on the line 4—4 of Fig. 2.

Fig. 5 is an axial sectional view of a portion of a modified cylinder construction.

Figure 1:
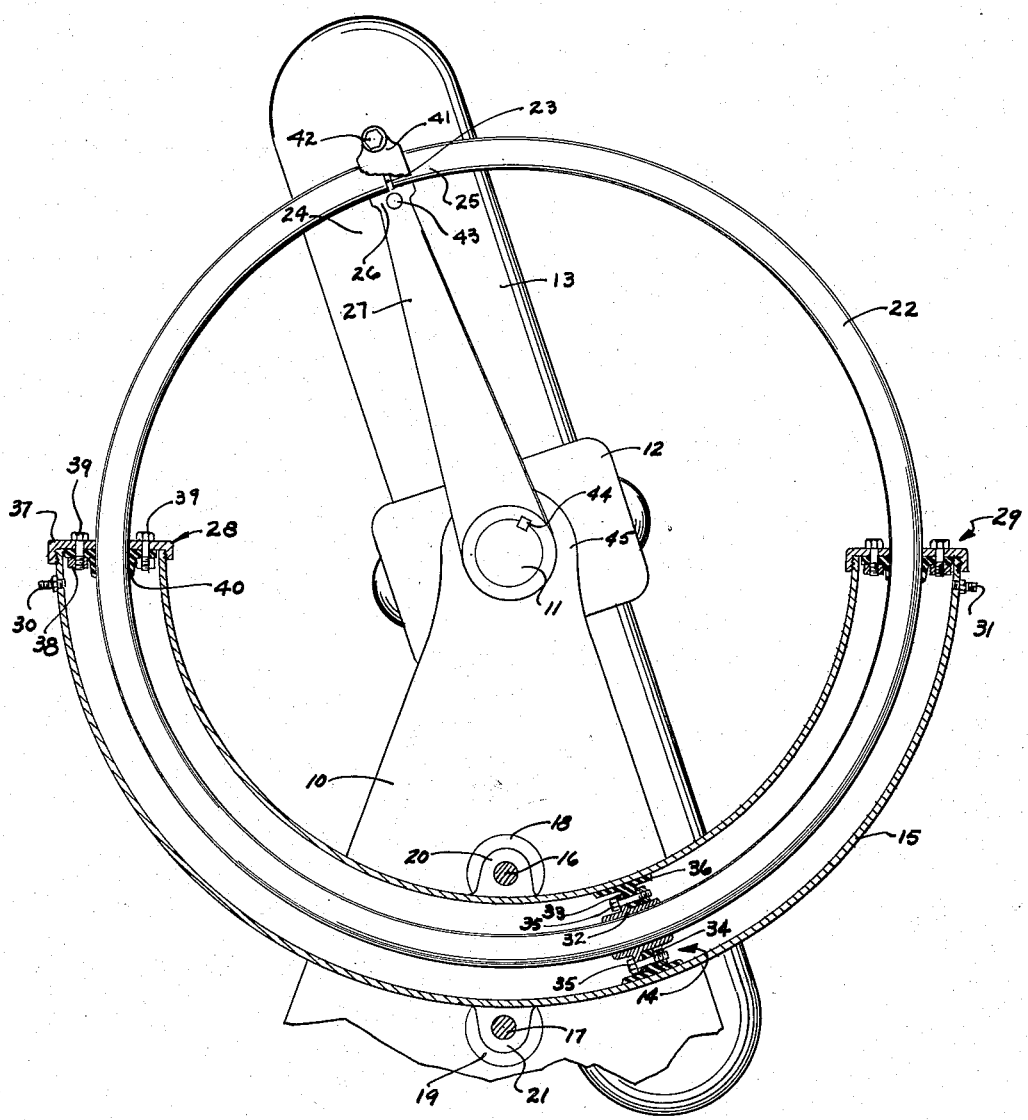

Turning to Fig. 1, the device is shown applied to a pilot truck of a tractor, having a forward projection 10 in which is journaled a stem, post, shank, or the like 11, substantially vertical in position, and which must be oscillated from side to side in steering the tractor. It will be understood that member 11 might be, within the contemplation of the invention, the rudder post of a boat or ship, or a control element in an aircraft. Other uses will suggest themselves to those skilled in the art.

Post 11 in the present instance is connected to a fork 12, supported by a front wheel 13, the construction being typical of a well-known type of farm tractor. For oscillating post 11 a piston generally designated as 14 is slidably arranged in a fluid-tight manner in a curved tubular displacement chamber 15 which is anchored by means of bolts 16 and 17 to pads 18 and 19 on above mentioned extension 10. Tube 15 has ears 20 and 21. Tube 15 corresponds to the usual cylinder in a common type of hydraulic or fluid actuating device and might be characterized as a "curved cylinder" although of course it is understood that a cylinder cannot be curved in the present sense and still be a cylinder. However it has long been desirable to apply such a "curved cylinder" to numerous purposes, but the difficulties of forming and assembling such a structure appeared to be insurmountable.

In the present instance chamber 15 is formed from a piece of tubing having a smooth interior and of a type which can be bent to the necessary curvature while remaining smooth. Ears 20 and 21 are applied and a piston 14 is fixed, as for example by brazing, to a ring-like piston rod 22. Rod 22 is interrupted at 23 so that by springing the ends apart in an up and down direction respectively as seen in Fig. 1, it may be run through tube 15, the ends 24 and 25 then being clamped together in any suitable clamping device 26. Clamping device 26 is fixed to or part of an arm 27 projecting in this case forwardly from post 11.

A cylinder head generally designated as 28 is fixed to one end of tube 15 and a similar cylinder head 29 is fixed to the opposite end of tube 15. A pressure fluid fitting 30 is introduced into tube 15 adjacent head 28 and a similar fitting 31 is introduced adjacent head 29. It will now be apparent that introduction of pressure fluid through fitting 30 will drive piston 14 to the right as seen in Fig. 1 and turn wheel 13 toward the left, fluid on the right hand side of piston 14 being exhausted through fitting 31. Introduction of fluid through fitting 31 will cause turning of wheel 13 in the opposite direction as will be apparent. It will be clear that no pivots, gearing, or other joints subject to wear are present in the connections between piston 14 and post 11.

Fluid may be supplied and withdrawn from fittings 30 and 31 by means of a displacement unit such as fully described and claimed in the copending application of Edward C. Myers, Serial Number 415,191, filed October 16, 1941, now Patent No. 2,394,252.

The resulting displacement chamber is in the form of a segment of a torus and will be hereinafter referred to as a toric segment.

Returning to a more detailed description of the apparatus, piston 14 comprises a fitting 32 having a flange 33 and on which is slidable a washer or ring 34. Ring 34 is urged toward flange 33 by screws 35—35. Between flange 33 and ring 34 is clamped a packing ring 36 of suitable material which fits the bore of tube 15 in a fluid-tight manner. It is contemplated that packing 36 may be of synthetic rubber-like material which will follow any minor irregularities in tube 15, the fluid pressure forcing the packing against the tube wall in well-known manner.

Head 28 comprises in the present instance a cap-like element 37 which is threadedly connected with tube 15 and has a ring 38 clamped by screws 39—39 against a packing 40 which embraces rod 22 in a fluid-tight manner.

Clamp 26 has a cap portion 41 secured thereto by bolts 42 and 43. Arm 27 is fixedly connected to post 11 by means of a key 44. Movement of piston 14 will accordingly cause rotation of rod or ring 22 and consequent turning of arm 27 and post 11. Post 11 is journaled in any suitable or well-known manner in a bearing portion 45 of above mentioned portion 10.

A modification of the arrangement is shown in Figs. 2, 3 and 4. In this embodiment an outer shell 46 is composed of upper and lower portions 47 and 48, respectively, each comprising or enclosing substantially one half of the desired toric segment. Portions 47 and 48 are clamped together by bolts 49—49 engaged in ears 50—50 spaced at suitable intervals along the edges of the portions 47 and 48. Portions 47 and 48 support within and between them a one-piece lining 51 which in the present instance is preferably made of a plastic substance which sets or dries with a smooth hard surface suitable for cooperation with a piston such as above described piston 14. Examples of such a plastic substance are known and form no part of the present invention. By supporting the liner in the portions 47 and 48 it is given ample strength, and since it is suitably hard and smooth, sections 47 and 48 need not be accurately machined, but may be left rough, the plastic material providing the smooth surface for the piston. In this way a difficult machining problem is eliminated.

It is to be noted that light gauge tubing of certain metals, for example copper, can be formed into curves of the radius desired without such distortion as to impair the usual smooth inner surface thereof. Such tubing, however, would in some circumstances be too light or weak to serve as a combination displacement chamber and bracket. However, such a tube bent to the desired radius and enclosed in the comparatively rough outer toric segment composed of portions 47 and 48, in similar manner to plastic liner 51 will work satisfactorily with a piston and will be protected from damage by the outer shell. Also the heavy outer shell or casing increases the fluid pressure resisting capacity of the thin liner tube and makes it strong enough to withstand the internal pressure.

Accordingly, it is within the contemplation of the invention to use the shell comprising portions 47 and 48 to enclose a bent metallic tube or liner forming a working surface for a piston such as 14.

Slight unavoidable variation occurs in the location of the post 11 and projection 10 in tractors, and in the related parts in other vehicles or devices with which the present invention would be used and to allow for this and avoid unnecessary care in aligning and mounting the device, shell 46 is preferably formed with an annular rib or boss 52 having a convex outer configuration enclosed in a socket-like fitting generally designated as 53 composed of upper and lower separable sections 54 and 55 within which boss 52 is rotatable but not otherwise movable. Fitting 53 has an attaching surface 56 which is fastened in suitable or well-known manner to an appropriate part of the tractor or other vehicle. Portion 54 has an ear 57 provided with an opening 58 for the reception of a bolt or screw for so fastening fitting 53, while portion 55 has a similar or suitable ear 59 providing an opening 60 for a similar purpose. Portions 54 and 55 are united by bolts 61—61 extending through appropriate bosses 62 and 63 on portion 55 and similar bosses on portion 54. Portions 54 and 55 are also provided with ears 64 and 65, respectively through which extends a bolt 66. Bolts 61—61 and 66 maintain fitting 53 solidly together about boss 52, cylinder or chamber 46 being thereby maintained firmly in place on the vehicle, but free to shift slightly if required by slight variations in manufacture.

Other means are contemplated for lining a cylinder or other displacement chamber, in Fig. 5 an outer shell 67 of metal or other suitable material forms the stress-bearing portion of the structure and has a head generally designated as 68 which may conveniently be identical or similar to above described head 28. A fluid supply pipe 69 leads into shell 67 in the present instance through a fitting 70 of suitable or well-known form. In this arrangement an inner liner 71 is provided formed of yieldable flexible material, for example any of the well-known synthetic rubber-like materials which are resilient and tenacious and not affected by oil. Natural rubber may be used if the fluid contemplated is of a character which will not damage it.

Liner 71 is preferably bonded to the metal shell 67 in well-known manner so as to be immovably maintained in place in the displacement chamber.

With this liner a piston 72 is used which comprises a disk-like portion 73 mounted on a piston rod 74 as between a flange 75 of a bushing 76 and a nut 77 threaded on bushing 76. Portion 73 has at its outer periphery outwardly directed knife edges 78 and 79, which are continuous about the circumference of the piston and which cooperate with the liner to seal or pack the piston against leakage of fluid from one side to the other thereof. Piston 72 is of a size slightly greater than the interior of liner 71 so as to press into the yielding surface thereof to a predetermined extent, as clearly indicated in Fig. 5. Knife edges 78 and 79 operate to scrap the surface of the liner substantially perfectly clean of fluid as the piston passes back and forth, so as to obviate substantially all leakage of fluid from one to the other side of the piston. It has been discovered that a knife edge pressed against a yielding surface in this manner will scrape the surface virtually completely clean, in fact in a manner which is more effective than where the situation is reversed, such as where a sharp edged rubber or similar packing unit is pressed against a smooth metallic element.

As will be apparent, in the forming of a toric displacement chamber as contemplated herein, a soft rubber-like lining of the character just described can serve the dual purpose of providing a fluid-tight seal between a liner and piston, and also that of providing a suitably smooth bore in a toric segmental displacement chamber without the necessity of accurate machining of the interior of such chamber.

The operation of the invention is thought to be apparent from the above description, sufficient to say, the supply of pressure fluid to one side of piston 14 and withdrawal thereof from the other results in movement of the piston in an arcuate or curved path corresponding to the shape of chamber or "cylinder" 15, which motion is transmitted by circular piston rod 22 to arm 27. Swinging of arm 27 turns post 11 and causes steering movement of fork 12 and wheel 13. Post 11 might equally well be the rudder post of a water or air craft, or other control element or the like within the contemplation of the invention.

The above being a complete description of an illustrative embodiment of the invention, what is claimed as new and desired to be secured by Letters Patent of the United States is:

1. In a displacement device the combination of a displacement chamber having a plastic rubber-like inner surface providing a smooth inner bore, a rigid displacing element movable in said chamber so as to displace fluid therein, and said element being larger than said bore so as to press into said rubber like surface, and having a sharp knife-edge in position to exert gentle pressure against said plastic rubber like surface in fluid-scraping relation thereto.

2. In an annular toric displacement chamber a plurality of curved channel portions arranged to be placed together to form an annular toric passageway, means for uniting said portions to form a curved tubular passageway, and a tubular integral lining unit of plastic rubber-like material providing a smooth inner bore, a rigid displacement producing element movable in said chamber so as to displace fluid therein, and said element being larger than said bore so as to press into said plastic material, and having a sharp knife-edge in position to exert gentle pressure against said plastic surface in fluid-scraping relation thereto, said lining unit forming a smooth jointless interior surface for said passageway.

3. In a displacement device a plurality of portions arranged to be placed together to form a tubular passageway including an integral tubular lining unit of plastic rubber-like material providing a smooth inner bore, a rigid displacement producing element movable in said chamber so as to displace fluid therein, and said element being larger than said bore so as to press into said plastic material, and having a sharp knife-edge in position to exert gentle pressure against said plastic surface in fluid-scraping relation thereto, said lining unit forming a smooth jointless interior surface for said passageway.

EDWARD C. MYERS.

References Cited in the file of this patent

UNITED STATES PATENTS

| Number | Name | Date |
|---|---|---|
| 299,161 | Peppard | May 27, 1884 |
| 458,458 | Hinrichs et al. | Aug. 25, 1891 |
| 1,024,098 | Price | Apr. 23, 1912 |
| 1,108,952 | Wales | Sept. 1, 1914 |
| 1,361,471 | Kozub | Dec. 7, 1920 |
| 1,621,858 | Sherwood | Mar. 22, 1927 |
| 1,917,180 | Zwick | July 4, 1933 |
| 2,259,432 | Failing | Oct. 14, 1941 |
| 2,389,654 | Werff | Nov. 27, 1945 |

FOREIGN PATENTS

| Number | Country | Date |
|---|---|---|
| 528,463 | France | Aug. 17, 1921 |
| 485,545 | Germany | Nov. 1, 1929 |